May 31, 1960  W. A. ETTER  2,938,999
ANTENNA-SWITCHING SYSTEM
Filed May 19, 1958  8 Sheets-Sheet 1

KEY TO FIGS. 10 AND 11

INVENTOR,
WILLIAM A. ETTER.
BY
Harry M. Saragovitz
ATTORNEY.

May 31, 1960 W. A. ETTER 2,938,999
ANTENNA-SWITCHING SYSTEM
Filed May 19, 1958 8 Sheets-Sheet 2

INVENTOR,
WILLIAM A. ETTER.
BY
Harry M. Saragovitz
ATTORNEY.

May 31, 1960 W. A. ETTER 2,938,999
ANTENNA-SWITCHING SYSTEM
Filed May 19, 1958 8 Sheets-Sheet 3

INVENTOR,
WILLIAM A. ETTER.
BY
Harry M. Saragovitz
ATTORNEY.

May 31, 1960 — W. A. ETTER — 2,938,999
ANTENNA-SWITCHING SYSTEM
Filed May 19, 1958 — 8 Sheets-Sheet 4
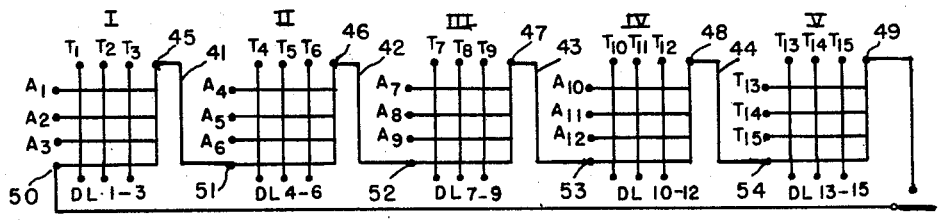
FIG. 8
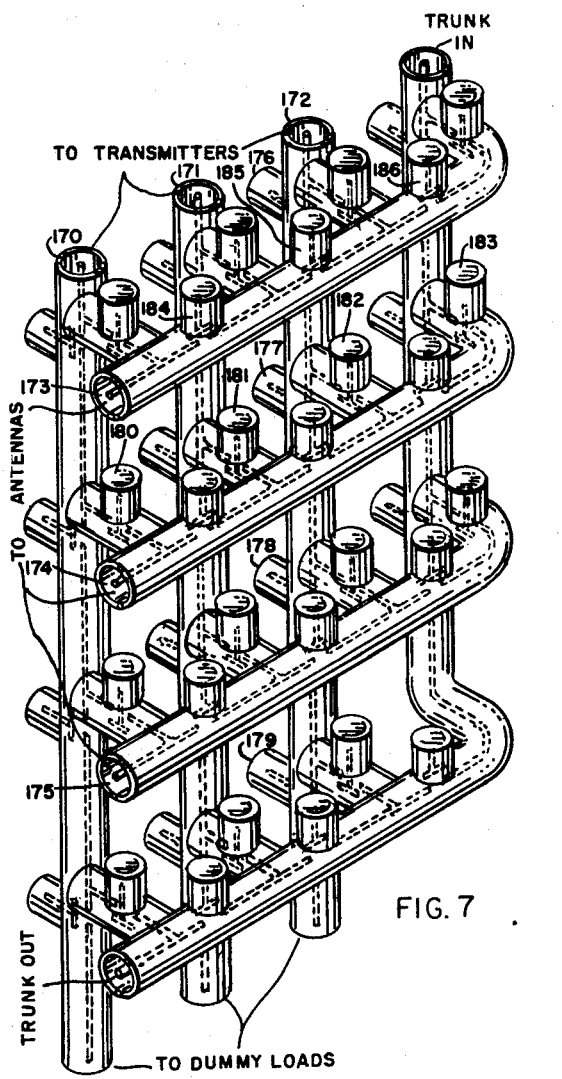
FIG. 7
FIG. 9
INVENTOR,
WILLIAM A. ETTER.
BY Harry M. Saragovitz
ATTORNEY May 31, 1960

W. A. ETTER 2,938,999

ANTENNA-SWITCHING SYSTEM

Filed May 19, 1958

INVENTOR,
WILLIAM A. ETTER.
BY
Harry M. Saragovitz
ATTORNEY.

REMOTE CONTROL SWITCH
GROUP II

INVENTOR,
WILLIAM A. ETTER.
BY
Harry M. Saragovitz
ATTORNEY.

United States Patent Office 2,938,999
Patented May 31, 1960

2,938,999

ANTENNA-SWITCHING SYSTEM

William A. Etter, 1130 N. Utah St., Arlington, Va.

Filed May 19, 1958, Ser. No. 736,414

9 Claims. (Cl. 250—17)

(Granted under Title 35, U.S. Code (1952), sec. 266)

The invention described herein may be manufactured and used by or for the Government of the United States of America for governmental purposes without the payment of any rolayties thereon or therefor.

The present invention relates generally to switching systems and, in particular, to switching systems for establishing connections between a plurality of transmitters or receivers and antennas with a high degree of flexibility.

In selectively establishing connections between any one of the plurality of antennas and any one of a plurality of transmitters in a high-powered transmitting station installation of the type used by large communications companies, or large military installations, there exists the difficulty of accomplishing this remotely or automatically. Actually, no satisfactory equipment capable of performing these selective switching functions has heretofore been devised. For one reason the cost of utilizing available switches, particularly coaxial-type switches, for an automatic arrangement made it prohibitive; for another, the switching must be accomplished at very high powers, 50 kw. or more, thus introducing problems which have defied previous attempts to solve them, the result being that even at most modern, high-powered radio transmitting installations the antenna switching from one transmitter to another is accomplished manually. Today the need for an effective, efficient, and inexpensive remote antenna-transmitter switching arrangement is greater than ever before.

Accordingly, it is a principal object of this invention to provide novel, highly flexible, switching system for use in selectively connecting any of a plurality of sources of radio frequency energy to any of a plurality of loads, from a remote location.

Another object of this invention is to provide a novel switching device for switching the center conductor of a rigid, semi-rigid, or flexible coaxial transmission line.

Another object of the present invention is to provide a switching arrangement of great flexibility whereby, through the use of the coaxial switch in accordance with the invention, the system may be extended to accommodate any number of radio frequency energy source-load situations.

A specific object of the invention is to provide a highly flexible selective switching system for use in connection with radio transmitters and transmitting antennas.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 7 illustrates a group switch comprising a plurality of the units depicted by Figs. 4, 5, and 6, in accordance with the invention;

Fig. 8 illustrates schematically a cross-bar switching system in accordance with the invention utilizing a plurality of group switches;

Fig. 9 is a representation of a control panel for use in controlling the switching functions of the invention;

Figure 12:
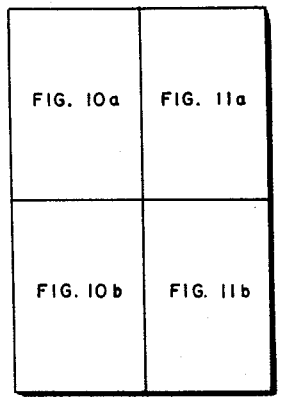
Figure 10A:
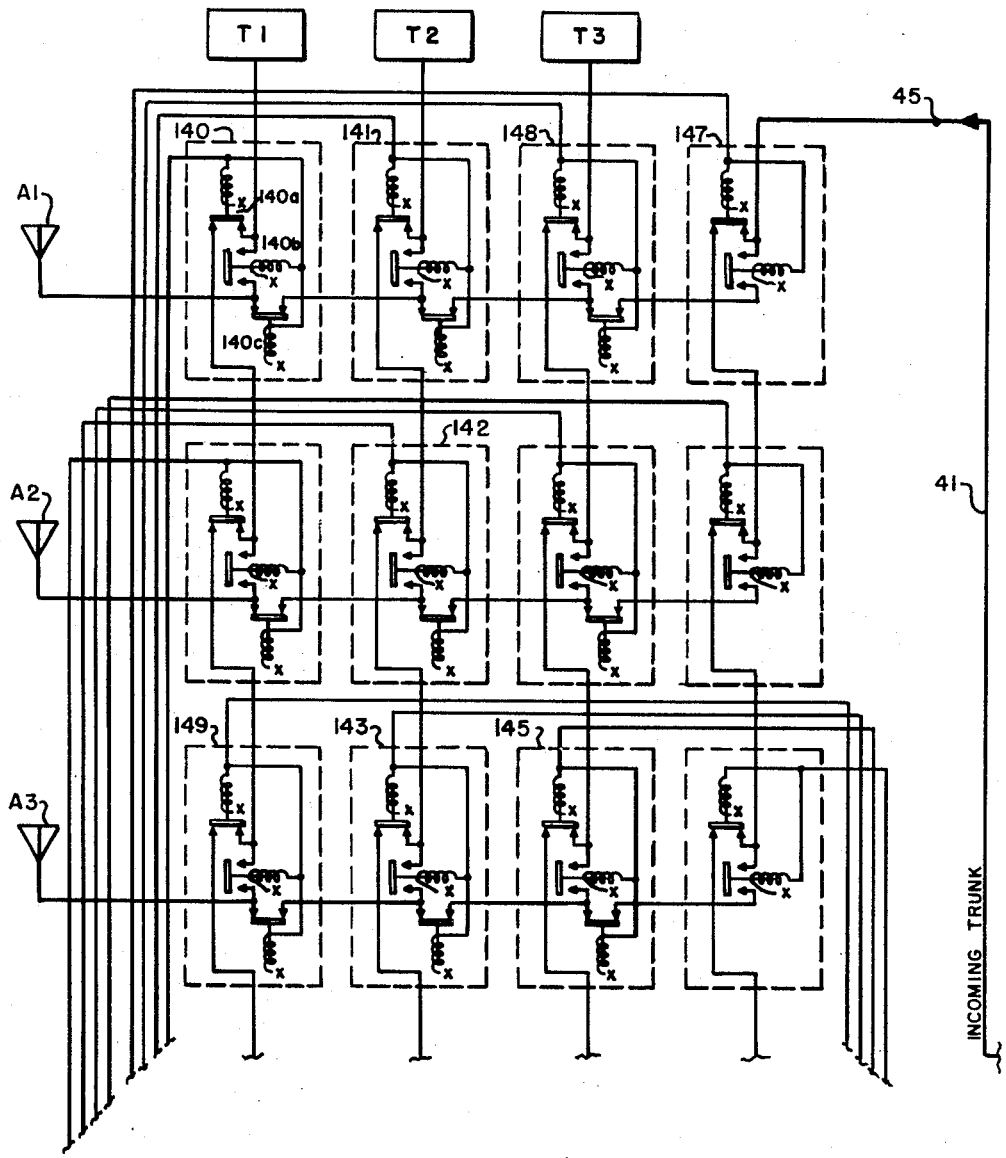
Figure 10B:
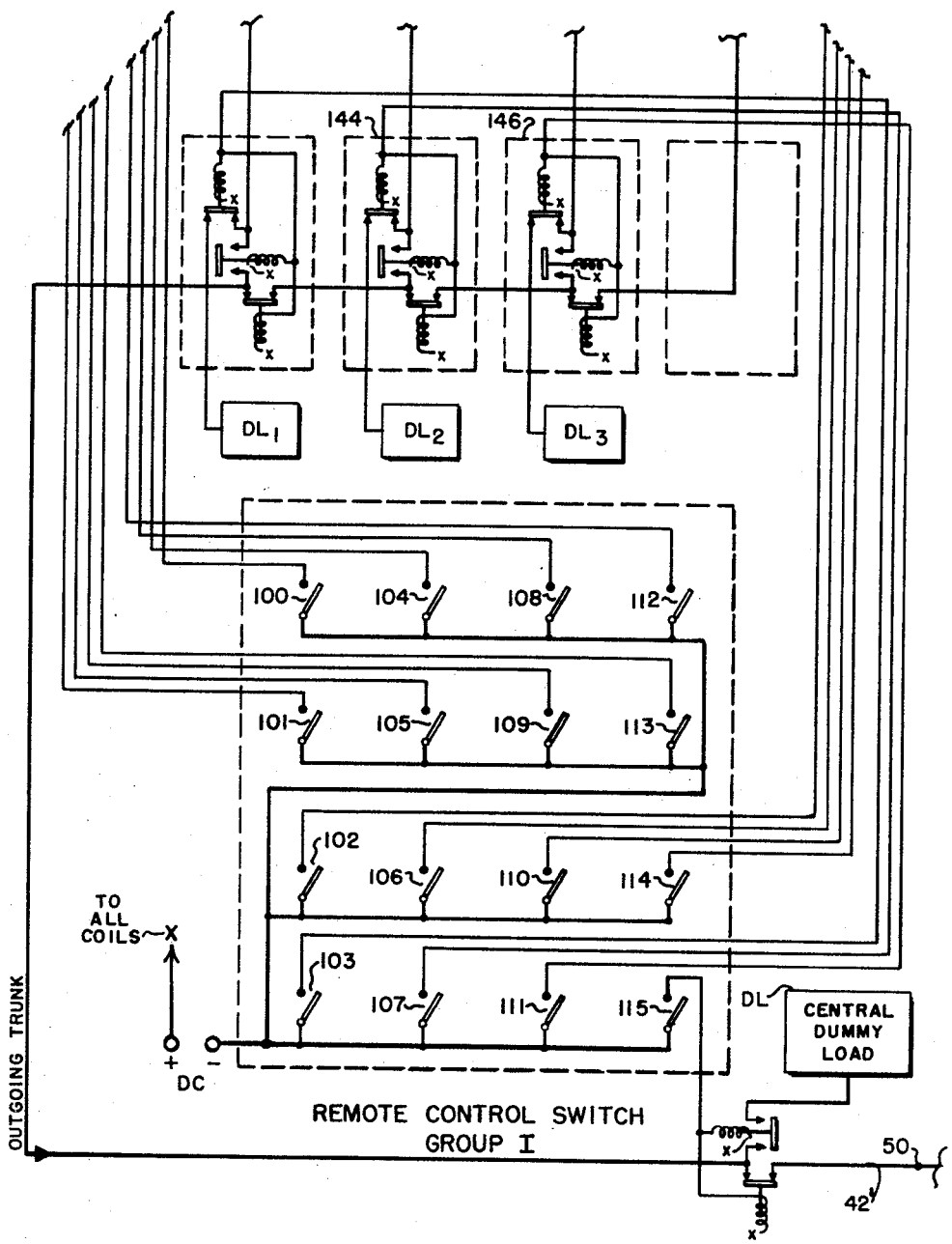
Figure 11A:
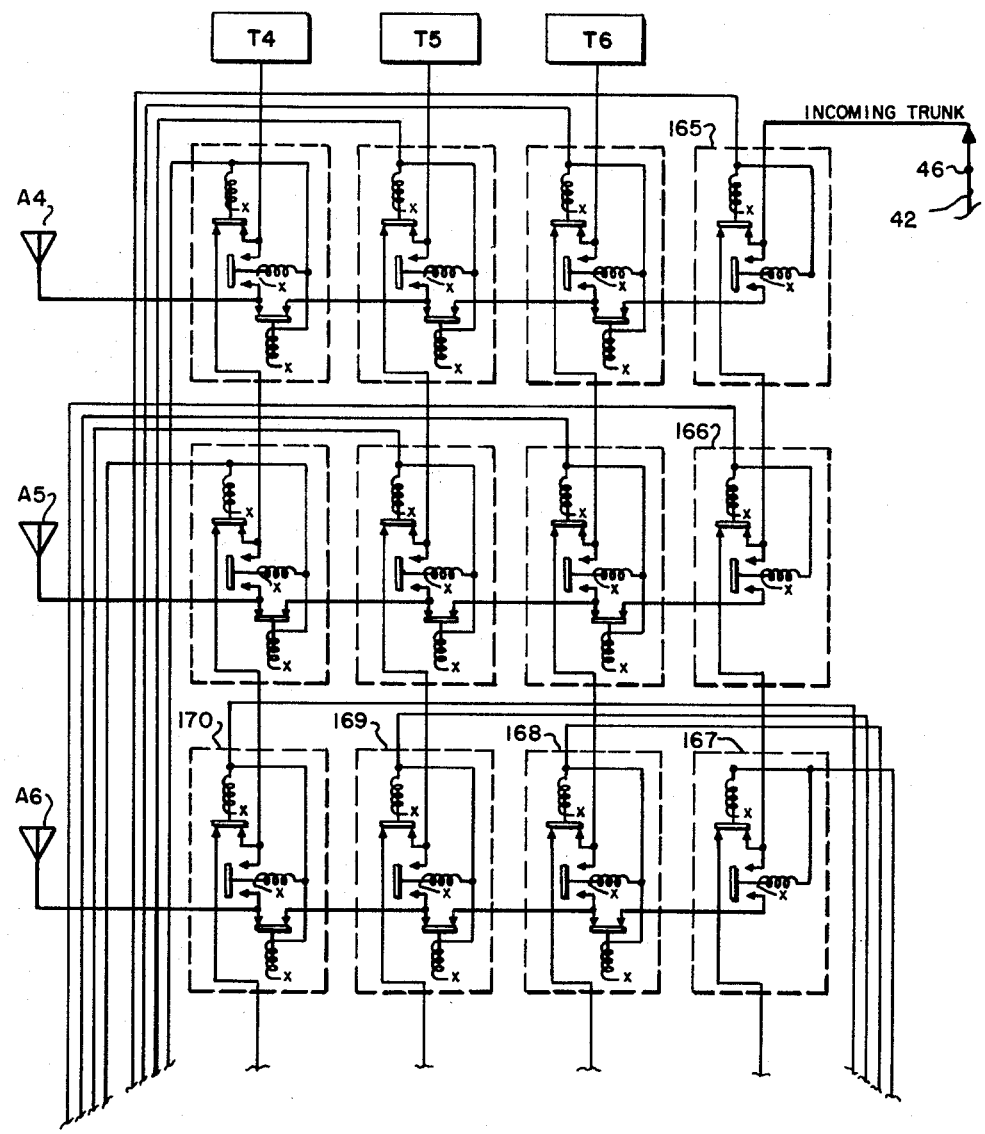
Figure 11B:
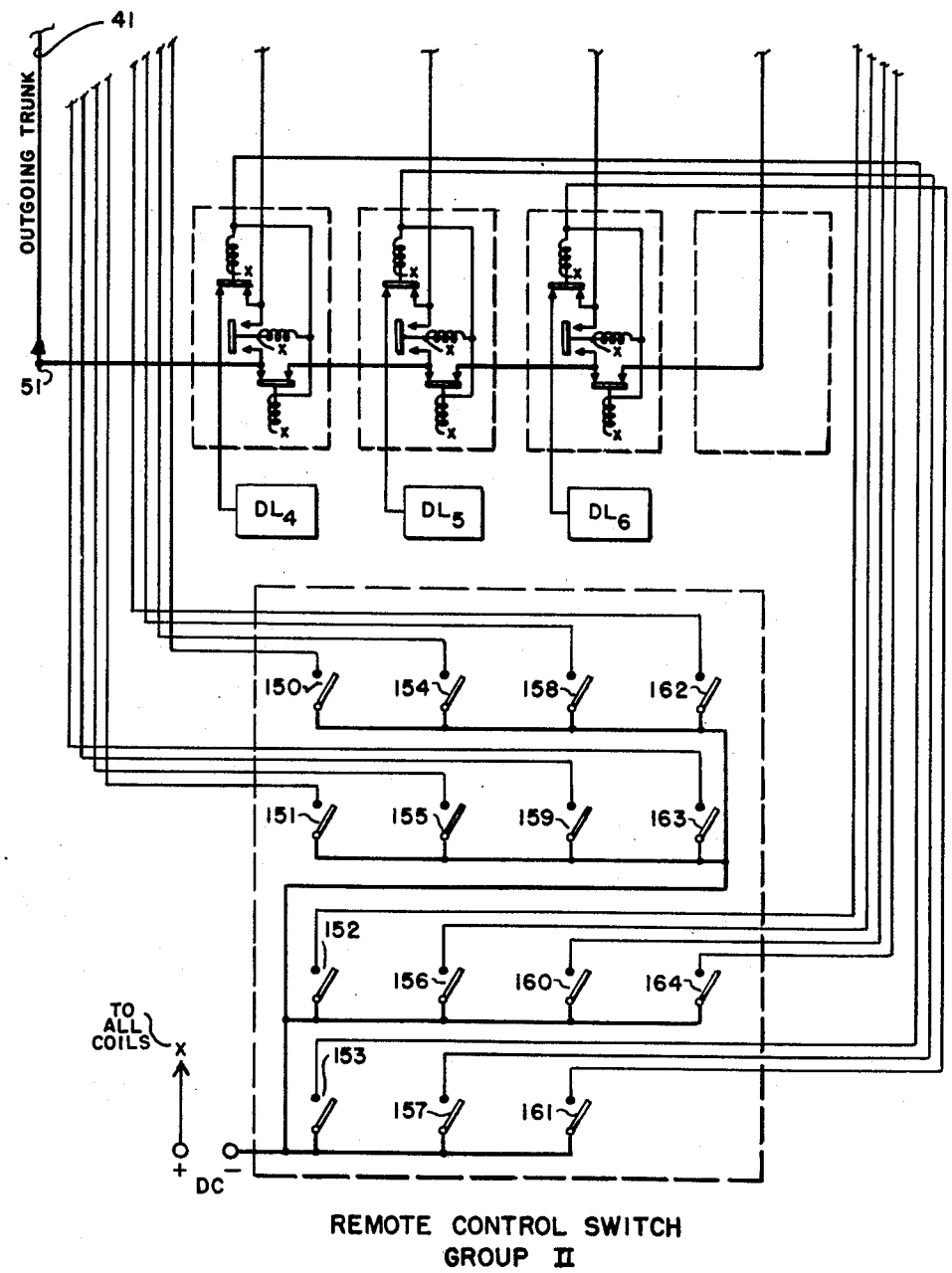

Fig. 10a and Fig. 10b comprise a schematic diagram of a group switch;

Fig. 11a and Fig. 11b comprise a schematic diagram of a second group switch;

Fig. 12 is a key to Figs. 10a, 10b, 11a, and 11b.

Figure 1:
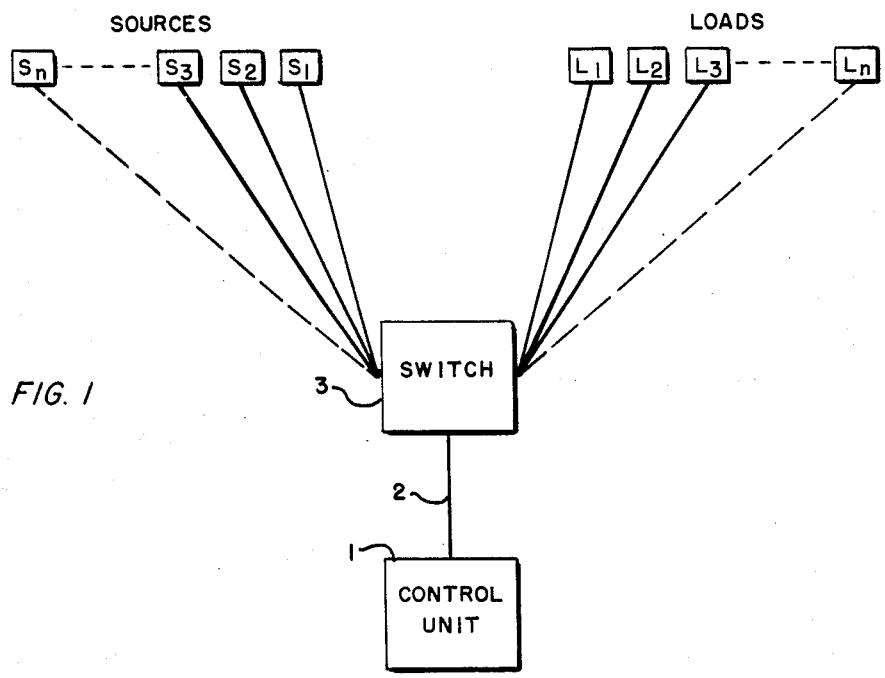
Fig. 1 is a block diagram of the switching systems in accordance with the invention.

The block diagram of Fig. 1 shows broadly the salient features of the present invention. Sources of energy $S_1$, $S_2$, $S_3$ ... $S_n$ are selectively connectable to loads $L_1$, $L_2$, $L_3$, ... $L_n$ by means of switch 3 which is energized by control unit 1, through connecting means 2. The circuit details involved in accompilshing the functions of Fig. 1, together with a description of the circuits will be discussed hereinafter in connection with Figs. 10a, 10b, 11a and 11b.

Figure 2:
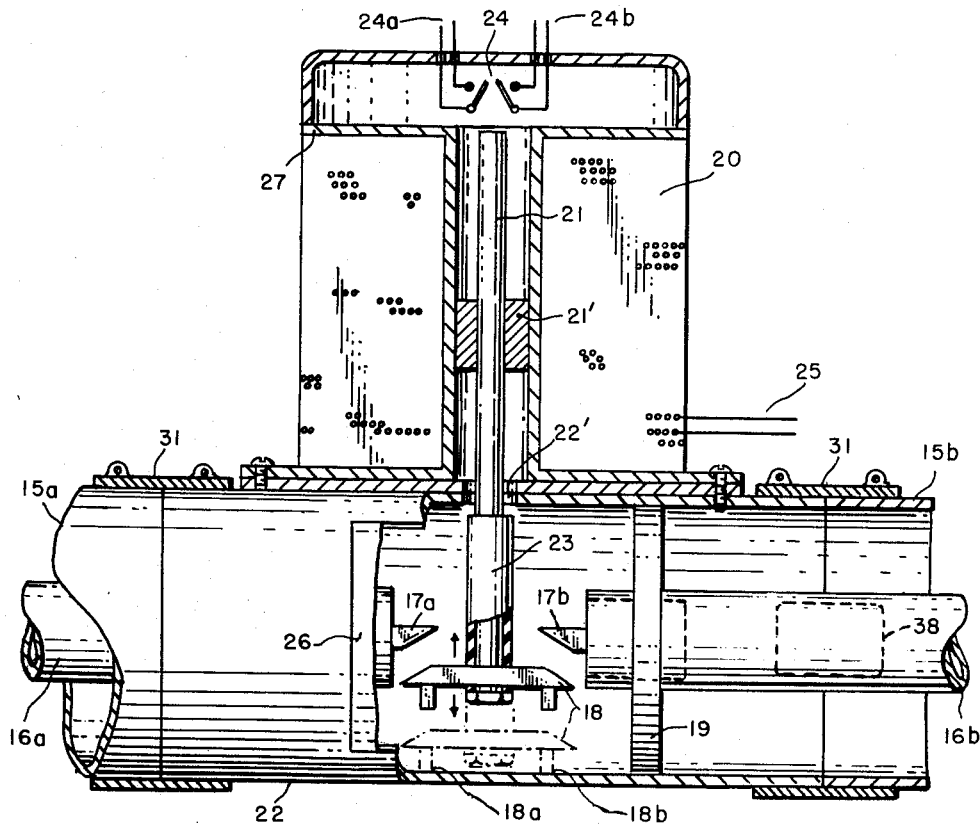
Fig. 2 is a view partly in section and partly broken away, of a coaxial line switch constructed in accordance with the invention.

Fig. 2 shows the construction of a coaxial line switch which may be used in the practice of the invention. It is mounted within the outer conductor 15 of a coaxial line and switches the center conductor 16a—16b at points 17a—17b. In the normally-open position, the shorting bar or contactor arm 18 rests on the bottom of the inner portion of the outer conductor 22, which points 18a—18b effectively grounding the shorting bar. The contacts 17a—17b on the center conductor 16 and 16a are firmly held in position by insulating spacers, one of which is shown and designated by reference numeral 19. In a preferred embodiment of the switch these spacers are made of "Teflon," although other high-grade dielectric materials may be used. Where the switch is used for switching a high-power energy it may be desirable to enclose it in a vacuum. Solenoid 20 is located in housing 27, and is positioned about plunger 21 as shown. Plunger 21 operates the shorting bar 18 through opening 22' in the outer conductor. Plunger 21 is guided within the solenoid 20 by means of member 21'. In one embodiment the upper portion of the plunger has a square cross-section in the guide region to prevent it twisting or otherwise changing alignment. The shorting bar 18 is insulated from the plunger by means of an insulating rod 23. Numeral 24 designates a switch means which is operated by plunger 21. Circuits 24a and 24b may be used to operate signal lights on the control panel, and a transmitter interlock circuit respectively.

In the operation of the switch of Fig. 2, power is supplied to solenoid 20 over wires 25. The application of power causes plunger 21 and shorting bar 18 to move from the position shown in dotted lines at the bottom of the outside conductor to a position of closing the circuit between the inner conductors 17a and 17b. In this position the switch means 24 is also closed thus operating such elements as may be connected in circuit therewith. Upon removal of current from solenoid 20, plunger 21 drops thereby breaking the center conductor circuit, and operating switch means 24.

Shorting bar 18 and contact members 17a—17b may be shaped to satisfy numerous design requirements. In the embodiment shown, the bar 18 and contacts 17a—17b are dimensioned to extend across the center of the inner conductor to provide a contact surface substantially equal in width to the diameter of the inner conductor. In other situations the shorting bar could be formed of round stock of a diameter equal to that of the inner conductor, and wherein the contact members 17a—17b comprise inner conductor ends. For high power switching with maximum reliability the switching portion would be inclosed within an evacuated envelope or chamber.

The switch of Fig. 2 may be connected to a transmission line, or to other switches (see Figs. 4, 5 and 6) by any of the well-known methods. In the embodiment shown the connection or coupling is accomplished by a combination clamping means 31, sometimes referred to as a "hose clamp" type, and an insert slug or "bullet" 38. The slug 38 may be either a resiliently arranged friction fit or of a spring loaded type.

Figure 3:
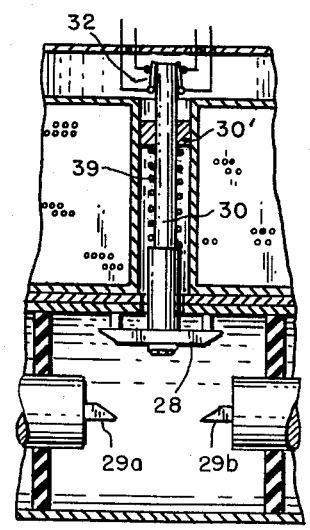
Fig. 3 is a view partly in section and partly broken away of a coaxial line switch showing an alternate form of the switch of Fig. 1.

Fig. 3 depicts a switch of the general type shown in Fig. 2, but wherein the shorting bar is normally in the "closed" position. The plunger 30 is shown in the position corresponding to an energized solenoid. Switch means 32 are closed and an open circuit exists between the center conductors 29a—29b. Upon the de-energization of the solenoid the plunger drops and the shorting bar 28 makes contact with conductors 29a—29b completing the center conductor circuit, and switch means 32 are "open." Plunger 30 is preferably springloaded downward by spring 39" to assure a good contact between bar 28 and members 29a—29b. As in the case of Fig. 2, the upper portion of the plunger travels within a guide member 30' to assure proper alignment of bar 28 with respect to the contacts.

Figure 4:
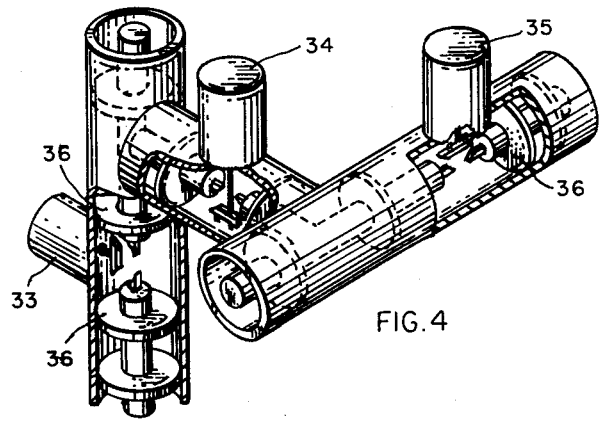
Fig. 4 is a diagrammatic isometric view partly in section of a plural-unit coaxial line switch in accordance with the invention.
Figure 5:
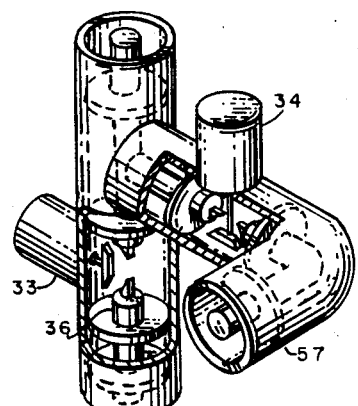
Fig. 5 is a diagrammatic isometric view partly in section showing another version of a plural-unit coaxial line switch in accordance with the invention.
Figure 6:
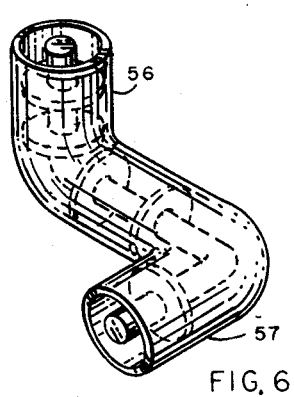
Fig. 6 is a diagrammatic isometric view of a trunk double-L portion of a coaxial line used in an embodiment of the invention.

By combining two, or three of the coaxial line switches of Figs. 2 and 3, in a novel arrangement, a plural-unit switch of the type shown in Fig. 4, or Fig. 5, is evolved. Two L-sections 56 and 57 are combined to produce the double-L unit of Fig. 6. The plural switches of Figs. 4 and 5, together with the double-L coaxial unit of Fig. 6, form the basic elements in the switching system in accordance with this invention. Fig. 7 illustrates an antenna-transmitter group switch comprising twelve each of the units depicted in Fig. 4, three each of Fig. 5, and one each of that shown in Fig. 6. The switch group of Fig. 7 will provide switching between any of three transmitters to any of three antennas, plus an incoming trunk from a similar group switch, and an outgoing trunk to a similar group switch.

Referring again to Fig. 4, which is a diagrammatic showing of a multiple-unit switch, the relays 33 and 35, although not so shown in the figure, are normally in a closed position. This is clearly shown in Figs. 10a—10b and Figs. 11a—11b, wherein switches of this type are designated by reference numerals 140, 141, 148, and 142. The "open" position of the switches as shown in Figs. 4 and 5 is for the purposes of clarity since it permits a more detailed showing of the switch elements. In operation the normal position of relay 34 is "open." As hereinbefore explained this switch is fabricated from standard rigid coaxial line, the center conductor being positioned by means of insulating wafers 36. The two-unit switch represented by Fig. 5 utilizes switches 33 and 34 and an L-section 57. Switches 147 and 165 of Figs. 10a and 11a respectively are of this type.

A cross-bar switching system having a high degree of flexibility is schematically illustrated in Fig. 8. The system shown comprises switch groups I, II, III, IV, and V, each of which is similar to that shown in Fig. 6 and which is connected in series by coaxial line trunk elements 41, 42, 43, and 44. Radio transmitters are connected to points $T_1$ thru $T_{15}$, there being three transmitters associated with each group switch. Incoming trunks are connected at points 45 to 49; and outgoing trunks at points 50 to 54. Connections for dummy loads associated with each group are made at points $DL_{1-3}$, $DL_{4-6}$, $DL_{7-9}$, $DL_{10-12}$ and $DL_{13-15}$. A central dummy load DL is also provided as shown. In the system of Fig. 8, transmitters carrying high priority traffic on major communications circuits would normally be connected to points $T_1$, $T_2$, $T_4$, $T_5$, $T_7$, $T_8$, $T_{10}$, $T_{11}$, $T_{13}$, and $T_{14}$; transmitters carrying lower priority traffic would likely be connected to points $T_3$, $T_6$, $T_9$, $T_{12}$ and $T_{15}$, and could be considered designated spares for the two major circuits in their respective groups. Also, it may be assumed that under normal conditions transmitters $T_1$, $T_2$ and $T_3$ are connected to antennas $A_1$, $A_2$, $A_3$, respectively; transmitters $T_4$, $T_5$ and $T_6$ connected to antennas $A_4$, $A_5$, and $A_6$, respectively, etc.

Figs. 10a and 10b, and Figs. 11a and 11b, arranged in accordance with Fig. 12 (key to Figs. 10a, 10b, 11a, and 11b), provide schematic showing of an embodiment of the invention in a two-matrix or cross-bar arrangement. It is to be understood that the switches, although represented for purposes of clarity as electromagnetically operated, may be any of the types known in the art. The circuit shown provides for the following operations: permits the remote switching of any of antennas $A_1$, $A_2$, or $A_3$ to any of the transmitters $T_1$, $T_2$ or $T_3$ of group I (Figs. 10a and 10b); permits the remote switching of any of antennas $A_4$, $A_5$, or $A_6$, to any of transmitters $T_4$, $T_5$ or $T_6$, of group II (Figs. 11a and 11b); permits the remote switching of any transmitter of group I to any antenna of group II, or vice versa. A dummy load is provided for each transmitter and is in circuit with the output of its respective transmitter prior to the transmitters' connection to an antenna.

A central dummy load DL is also provided for use under certain conditions. The system can readily be extended to include more than two groups of switches; this is diagrammatically depicted in Fig. 7. Thus, by extending the system in accordance with this invention any number of antennas and transmitters may be switched to produce the desired antenna-transmitter combinations. As shown in Fig. 7, parts 170, 171 and 172 are coaxial line elements which, in operation, are connected at the upper end to radio transmitters. Positioned longitudinally in each of the elements are coaxial switches which sectionalize the elements by switching the center conductor of the elements. For example, coaxial line element 172 has sectionalizing switches 176, 177, 178 and 179 positioned at points intermediate the regions of cross-over between the vertical element 172 and horizontal elements 173, 174 and 175. Similarly, coaxial line elements 173, 174 and 175 which are normally connected to antennas are sectionalized by switches. For example, coaxial line element 173 has sectionalizing switches 184, 185 and 186 positioned longitudinally at points intermediate the cross-over regions. Switches 180, 181 and 182 provide means for interconnecting sections of the horizontal element 174 and sections of the vertical elements 170, 171 and 172 at points of cross-over.

Referring now to Figs. 10a and 10b, which comprise group I, switches 100, 104 and 108 function to connect transmitter $T_1$, $T_2$, or $T_3$ respectively, to antenna $A_1$; switches 101, 105 and 109 function to connect transmitter $T_1$, $T_2$, or $T_3$ respectively, to antenna $A_2$; and similarly switches 102, 106 and 110 function to connect antenna $T_1$, $T_2$ or $T_3$, respectively, to antenna $A_3$. Switches 112, 113, and 114 function to connect antenna $A_1$, $A_2$ or $A_3$ respectively, to incoming trunk 41' (which connects to lead 41 of group II), and are operated when it is desired to connect transmitters of group II, $T_4$, $T_5$ or $T_6$ to the antennas of group I. Switches 103, 107 and 111 are used when it is desired to connect the transmitters of group I to outgoing trunk 42 for (a) connection to the central dummy load DL, in which case switch 115 must be closed; or (b) connection to antennas of group II, in which case switches 162, 163 or 164 must also be closed.

Refer now to Figs. 11a–11b which is a schematic showing of the antenna transmitter switching arrangement of group II. Remote control switches 150, 154, and 158 are used when conducting transmitter $T_4$, $T_5$ or $T_6$ to antenna $A_4$; switches 151, 155 and 159, respectively, operate to switch transmitter $T_4$, $T_5$ or $T_6$ to antenna $A_5$; and switches 152, 156 and 160 are operated to switch the transmitters of group II to antenna $A_6$. Switch 162, 163 or 164 is used when it is desired to connect antenna $A_4$, $A_5$ or $A_6$ to the incoming trunk-2. Switch 153, 157 or 161 is used to connect the transmitters $T_4$, $T_5$ or $T_6$ respectively, to the outgoing trunk. Dummy loads $DL_4$, $DL_5$ and $DL_6$ are shown connected to their respective transmitters $T_4$, $T_5$ and $T_6$ thru the normal positions of the coaxial switch relay armatures.

For the purpose of describing the operation of the switching system of Figs. 10a, 10b, and 11a, and 11b, assume that it is desired to: (a) connect transmitter $T_2$ to antenna $A_3$; and (b) disconnect $T_2$ from $A_3$ and to connect it to antenna $A_6$ of group II.

(a) Switching $T_2$ to antenna $A_3$: as explained hereinbefore the transmitter $T_2$ is shown initially connected to its dummy load $DL_2$ thru the initial relay positions of switch units 141, 142, 143 and 144, and that closing switch means 106 will cause relays of switch unit 143 to operate to disconnect $DL_2$ from $T_2$; disconnects switch units 143 from 148; and completes the connection between $A_3$ and $T_2$ through switch units 149 and 143. In this operation only the switches, transmitters and antennas of group I were involved.

(b) Disconnection of $T_2$ from $A_3$ of group I and connecting it to antenna $A_6$ of group II: Switch means 106 is opened thereby restoring initial conditions of the system; switch means 107 is closed thereby operating switch unit 144 to disconnect $T_2$ from its dummy load $DL_2$ and opens the circuit between switch unit 144 and switch unit 146 therefore connecting $T_2$ to the outgoing trunk; then by closing switch means 164 of the group II control panel, the incoming trunk is connected through switch units 165, 166, 167, 168, 169 and 170 to antenna $A_6$.

Although the control panels for groups I and II are shown as separate units, in practice they will be combined into a single control panel board. Appropriate signal indicating lights will normally be connected in each switch circuit to indicate at a glance the transmitter-antenna arrangements in use. Figure 9 of the drawings illustrates a form of control which might be used in connection with one-group switch-installation.

Obviously many modifications and variations of the present invention are possible in the light of the above teachings, the plural unit relay which is shown as electromagentically actuated might be of a pneumatic type; the relay circuit breaking portion could be housed in an evacuated envelope; and the control panel could be arranged to perform plural circuit-closing operations to reduce the number of switches to be operated when switching between matrix groups. It is therefore to be understood, that within the scope of the appended claims, the invention may be practiced otherwise than as described.

What is claimed is:

1. A switching system for connecting any one of a plurality of transmitters to any one of a plurality of antennas comprising a plurality of coaxial line elements, means connecting each of said elements to a corresponding transmitter, a plurality of switch means positioned in spaced relationship in each of said elements for selectively controlling the transmission path thereof; a second plurality of coaxial line elements in transverse relationship to said first plurality of elements, means connecting each of said last-named elements to a corresponding antenna, switch means disposed longitudinally along said last named elements for selectively controlling the transmission path thereof; and coaxial means for selectively connecting a section of each of said first plurality of elements to a selective section of said second plurality of elements.

2. A switching system comprising a plurality of interconnected cross-bar switching matrices wherein each matrix comprises: a plurality of coaxial line elements, means connecting each of said elements to a corresponding source of energy, a plurality of switch means positioned in spaced relationship in each of said elements for selectively controlling the transmission path thereof, a second plurality of coaxial line elements in transverse relationship to said first plurality of elements, means connecting each of said last named elements to a corresponding load means, switch means positioned longitudinally along said last-named elements for selectively controlling the transmission path thereof, and coaxial means for selectively connecting a section of each of said plurality of elements to a selective section of said second plurality of elements; whereby any one of a plurality of sources of energy associated with any one of said matrices may be selectively connected to any one of a plurality of loads associated with any one of the matrices.

3. A switching system for connecting any of a plurality of sources of electrical energy to any of a plurality of loads, comprising: a plurality of sources of energy, a first transmission means comprising a plurality of transmission line elements, means connecting each of said sources of energy to a corresponding element of said plurality of transmission line elements, switch means in each of said transmission line elements for sectionalizing said line whereby the number of sections utilized may be selectively controlled; a plurality of load means, a second transmission means comprising a plurality of transmission line elements each connected to a corresponding load means, switch means in each of said elements of said second transmission means for sectionalizing said line whereby the length of each element may be selectively controlled; and means for selectively connecting predetermined sections of said first transmission means to predetermined sections of said second transmission means, whereby any of said sources of energy may be connected to any one of said loads.

4. In a switching system for connecting any of a plurality of loads to any of a plurality of sources of energy, and wherein the connecting means utilized comprise coaxial transmission line elements, a plural unit coaxial transmission line switch comprising a first coaxial switch which is normally in an open condition, and a second coaxial switch which is normally in a closed condition; each of said switches comprising a section of coaxial transmission line having an outer conductor to form an unbroken connection, an opening in a wall of said outer conductor, a housing positioned over said opening, a solenoid positioned within said housing and aligned with said opening, a plunger positioned within said solenoid having one of its ends extending thru said opening into the interior of said section, an inner conductor formed of two sections in coaxially spaced alignment having a pair of opposed ends to form the switch terminals; a conducting member mounted on said one end of said plunger and insulated therefrom, said conducting member in said first switch normally-initially making contact with the spaced inner-conductor terminals of said first switch, and the conducting member in said second switch normally-initially positioned to provide an open circuit; and means for coaxially connecting one end of said second switch to a point intermediate one end and said housing of said first switch, thereby providing a plural unit coaxial switch.

5. A switching system for connecting any of a plurality of sources of radio frequency energy to any of a plurality of loads, comprising: a plurality of sources of energy, a first transmission means connected to each of said sources of energy, means in said transmission means spaced longitudinally thereof for sectionalizing said transmission means whereby the length of said separate transmission means may be selectively controlled; a plurality of load means, a second transmission means connected to each of said load means, means in said second transmission means spaced longitudinally thereof for sectionalizing said second transmission means; and means for selectively connecting a section of each of said first transmission means to a selected section of said second transmission means, whereby any one of said sources of energy may be connected to any one of said loads.

6. The switching system according to claim 5 wherein said sources of energy comprise radio transmitters, and wherein said loads comprise antenna systems.

7. The switching system according to claim 5 wherein said sources of energy comprise radio receiving antennas, and wherein said loads comprise radio receivers.

8. An antenna-transmitter switching system, comprising: a plurality of transmitters, a first plurality of coaxial line elements wherein each element is connected to a transmitter; a plurality of antennas, a second plurality of coaxial elements wherein each of said last-named elements is connected to an antenna; said second plurality of elements disposed transversely to said first plurality of elements to provide cross-over regions; each of said first and second plurality of coaxial elements having means spaced longitudinally thereof at points intermediate said cross-over regions; for selectively controlling the length therof and means for selectively connecting a section of each of said first plurality of elements to a section of said second plurality of elements, whereby any one of said transmitters may be connected to any one of said antennas.

9. A switching system according to claim 8 wherein said means spaced longitudinally, and said means for selectively connecting comprise a plural unit coaxial switch at said cross-over regions.

References Cited in the file of this patent
UNITED STATES PATENTS

| | | |
|---|---|---|
| 2,082,932 | Young et al. | June 8, 1937 |
| 2,127,336 | Leng | Aug. 16, 1938 |
| 2,302,535 | Durbin | Nov. 17, 1942 |
| 2,498,907 | Atwood et al. | Feb. 28, 1950 |
| 2,662,142 | Nelson | Dec. 8, 1953 |
| 2,762,881 | Brockwell et al. | Sept. 11, 1956 |